(12) United States Patent
Cheng et al.

(10) Patent No.: US 12,010,682 B2
(45) Date of Patent: Jun. 11, 2024

(54) CHANNEL MONITORING WITH COMPLEXITY CONSTRAINTS

(71) Applicant: Telefonaktiebolaget LM Ericsson (publ), Stockholm (SE)

(72) Inventors: Jung-Fu Cheng, Fremont, CA (US); Stefan Eriksson Löwenmark, Färentuna (SE); Havish Koorapaty, Saratoga, CA (US); Xingqin Lin, Santa Clara, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 543 days.

(21) Appl. No.: 16/969,825

(22) PCT Filed: Feb. 18, 2019

(86) PCT No.: PCT/SE2019/050144
§ 371 (c)(1),
(2) Date: Aug. 13, 2020

(87) PCT Pub. No.: WO2019/160498
PCT Pub. Date: Aug. 22, 2019

(65) Prior Publication Data
US 2021/0084637 A1 Mar. 18, 2021

(30) Foreign Application Priority Data
Feb. 16, 2018 (SE) .................................. 1800043-0

(51) Int. Cl.
*H04W 72/04* (2023.01)
*H04W 72/0446* (2023.01)
*H04W 72/20* (2023.01)
*H04W 72/51* (2023.01)

(52) U.S. Cl.
CPC ....... *H04W 72/20* (2023.01); *H04W 72/0446* (2013.01); *H04W 72/51* (2023.01)

(58) Field of Classification Search
CPC ......... H04W 72/0406; H04W 72/0446; H04W 72/048
See application file for complete search history.

(56) References Cited

U.S. PATENT DOCUMENTS

2019/0253308 A1* 8/2019 Huang ................ H04L 43/0823
2019/0254025 A1* 8/2019 Lee .................... H04W 72/0446
2021/0067268 A1* 3/2021 Seo .................... H04W 72/0446

OTHER PUBLICATIONS

MCC Support, R1-180xxxx, 'Draft Report of 3GPP TSG RAN WG1 #AH_1801 v0.1.0', Feb. 26-Mar. 2, 2018, 3GPP TSG RAN WG1 Meeting #92, pp. 1-5. (Year: 2018).*

(Continued)

*Primary Examiner* — Melvin C Marcelo
(74) *Attorney, Agent, or Firm* — Weisberg I.P Law, P.A.

(57) ABSTRACT

Methods and apparatuses are disclosed for configuring a search space to the WD based on a Control Channel Element (CCE) limit of the WD. According to one or more embodiments, a network node configured to communicate with a wireless device is provided. The network node includes processing circuitry configured to receive a Control Channel Element, CCE, limit of the wireless device and configure a search space for the wireless device to monitor based at least in part on the CCE limit of the wireless device.

21 Claims, 13 Drawing Sheets

(56) References Cited

OTHER PUBLICATIONS

LG Electronics, R1-1800372, 'Remaining issues on search space', Jan. 22-26, 2018, 3GPP TSG RAN WG1 Meeting AH 1801, pp. 1-4. (Year: 2018).*

Panasonic, R1-1800518, 'Remaining issues on search space', Jan. 22-26, 2018, 3GPP TSG RAN WG1 Meeting AH 1801, pp. 1-5. (Year: 2018).*

International Search Report dated May 17, 2019 for International Application No. PCT/SE2019/050144 filed on Feb. 18, 2019, consisting of 9-pages.

3GPP TSG RAN WG1 Meeting AH 1801 R1-1800631; Title: On remaining issues of search spaces and blind detection Agenda Item: 7.3.1.2; Source: InterDigital Inc.; Document for: Discussion and Decision; Date and Location: Jan. 22-26, 2018, Vancouver, Canada, consisting of 5-pages.

3GPP TSG RAN WG1 Meeting AH 1801 R1-1800868; Title: Remaining issues on control resource set and search space; Agenda Item: 7.3.1.2; Source: Qualcomm Incorporated; Document for: Discussion and Decision; Date and Location: Jan. 22-26, 2018, Vancouver, Canada, consisting of 7-pages.

3GPP TS 38.213 V15.0.0 3rd Generation Partnership Project; Technical Specification Group Radio Access Network; NR; Physical layer procedures for control (Release 15); Dec. 2017, consisting of 56-pages.

3GPP TS 38.212 V15.0.0; 3rd Generation Partnership Project; Technical Specification Group Radio Access Network; NR; Multiplexing and channel coding (Release 15); Dec. 2017, consisting of 82-pages.

3GPP TS 38.214 V15.0.0; 3rd Generation Partnership Project; Technical Specification Group Radio Access Network; NR; Physical layer procedures for data (Release 15); Dec. 2017, consisting of 71-pages.

* cited by examiner

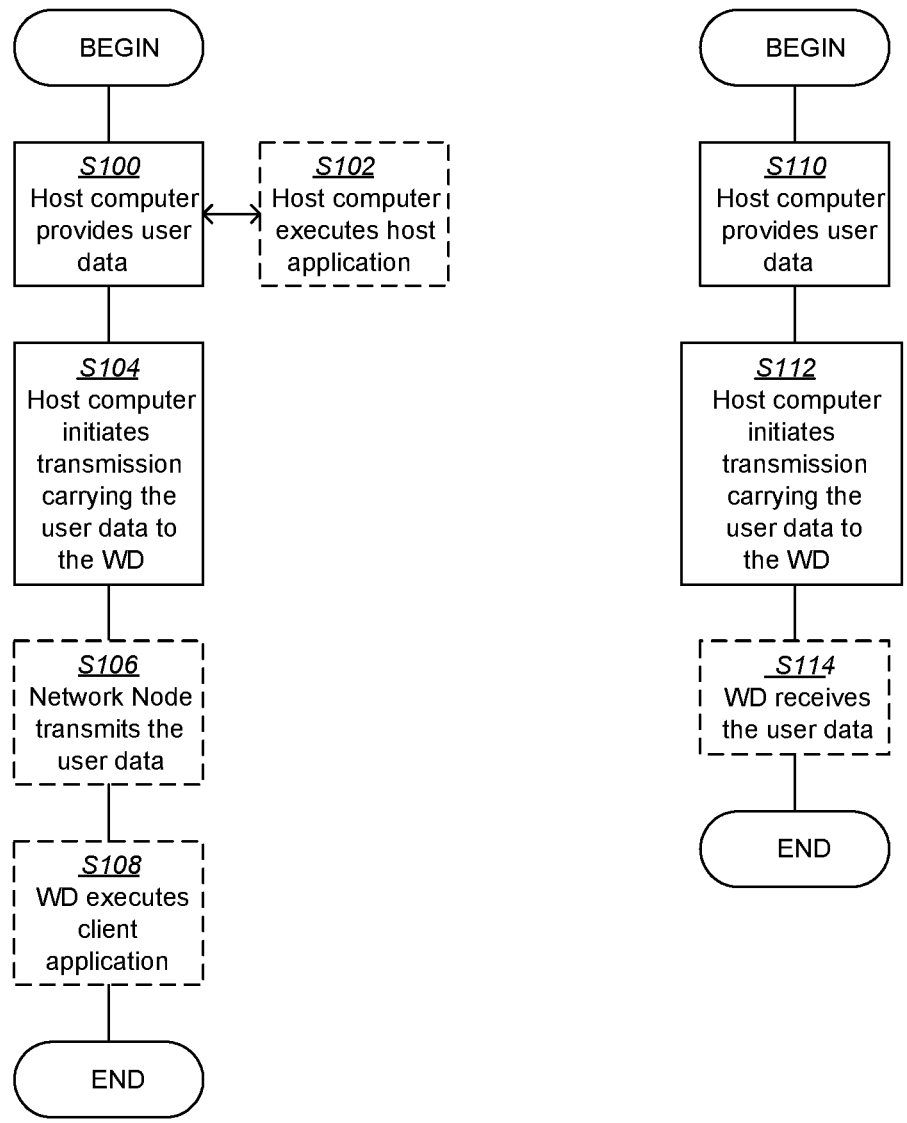

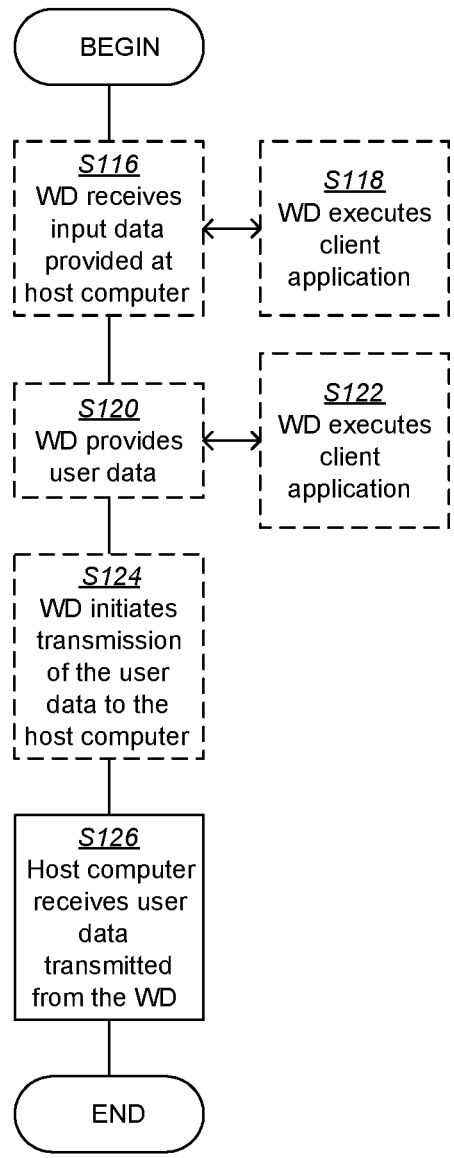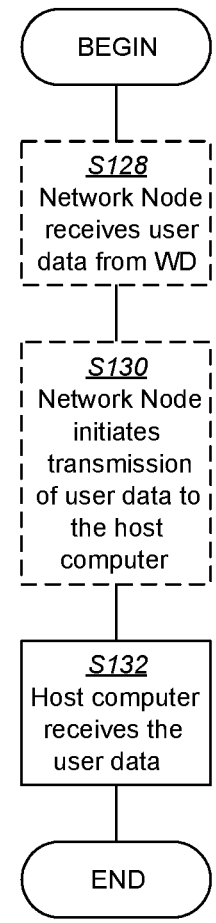
FIG. 8
FIG. 9

CHANNEL MONITORING WITH COMPLEXITY CONSTRAINTS

CROSS-REFERENCE TO RELATED APPLICATIONS

This application is a Submission Under 35 U.S.C. § 371 for U.S. National Stage Patent Application of International Application No.: PCT/SE2019/050144, filed Feb. 18, 2019 entitled "CHANNEL MONITORING WITH COMPLEXITY CONSTRAINTS," which claims priority to Swedish Application No.: 1800043-0, filed Feb. 16, 2018, the entireties of both of which are incorporated herein by reference.

TECHNICAL FIELD

The present disclosure relates to wireless communications, and in particular, to methods and apparatuses for channel monitoring with complexity constraints.

BACKGROUND

The new radio (NR) (also known as "5G") standards by the Third Generation Partnership Project (3GPP) are being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals (TTIs). In NR in addition to transmission in a slot, a mini-slot transmission is also allowed to reduce latency. A mini-slot may include of any number of 1 to 14 Orthogonal Frequency-Division Multiplexing (OFDM) symbols. It should be noted that the concepts of slot and mini-slot are not specific to a specific services, meaning that a mini-slot may be used for either eMBB, URLLC, or other services.

PDCCH Monitoring

In 3GPP NR standards, downlink control information (DCI) may be received over the physical layer downlink control channel (PDCCH). The PDCCH may carry Downlink Control Information (DCI) in messages with different formats. DCI format 0_0 and 0_1 are DCI messages used to convey uplink grants to the wireless device (WD) (e.g., user equipment (UE)) for transmission of the physical layer data channel in the uplink, Physical Uplink Shared Channel (PUSCH), and DCI format 1_0 and 1_1 are used to convey downlink grants for transmission of the physical layer data channel on the downlink, Physical Downlink Shared Channel (PDSCH). Other DCI formats (2_0, 2_1, 2_2 and 2_3) are used for other purposes such as transmission of slot format information, reserved resource, transmit power control information, etc.

A PDCCH candidate is searched within a common or WD-specific search space which is mapped to a set of time and frequency resources referred to as a control resource set (CORESET). The search spaces within which PDCCH candidates may be monitored are configured to the WD via radio resource control (RRC) signaling. A monitoring periodicity is also configured for different PDCCH candidates. In any particular slot the WD may be configured to monitor multiple PDCCH candidates in multiple search spaces which may be mapped to one or more CORESETs. PDCCH candidates may be monitored multiple times in a slot, once every slot or once in multiple of slots, etc.

The smallest unit used for defining CORESETs may be a Resource Element Group (REG) which may be defined as spanning 1 Physical Resource Block (PRB)×1 OFDM symbol in frequency and time. Each REG may include demodulation reference signals (DM-RSs) to aid in the estimation of the radio channel over which that REG was transmitted. When transmitting the PDCCH, a precoder may be used to apply weights at the transmit antennas based on some knowledge of the radio channel prior to transmission. It is possible to improve channel estimation performance at the WD by estimating the channel over multiple REGs that are proximate in time and frequency if the precoder used at the transmitter for the REGs is not different. To assist the WD with channel estimation the multiple REGs can be grouped together to form a REG bundle and the REG bundle size for a CORESET is indicated to the WD. The WD may assume that any precoder used for the transmission of the PDCCH is the same for all the REGs in the REG bundle. A REG bundle may consist of 2, 3 or 6 REGs.

A control channel element (CCE) may be considered a group of resources which may be used to send a PDCCH. The CCE may be made of 6 REGs. The REGs within a CCE may either be contiguous or distributed in frequency. When the REGs are distributed in frequency, the CORESET may be said to be using an interleaved mapping of REGs to a CCE and if the REGs are not distributed in frequency, a non-interleaved mapping is said to be used.

Interleaving can provide frequency diversity. Not using interleaving may be beneficial for cases where knowledge of the channel allows the use of a precoder in a particular part of the spectrum improve the Signal to Interference and Noise Ratio (SINR) at the receiver.

A PDCCH candidate may span 1, 2, 4, 8 or 16 CCEs. If more than one CCE is used, the information in the first CCE may be repeated in the other CCEs. Therefore, the number of aggregated CCEs used may be referred to as the aggregation level for the PDCCH candidate.

A hashing function may be used to determine the CCEs corresponding to PDCCH candidates that a WD monitors within a search space set. The hashing may be performed differently for different WDs so that the CCEs used by the WDs are randomized and the probability of collisions between multiple WDs for which PDCCH messages are included in a CORESET is reduced.

A description of how the hashing may be performed (based on the Enhanced-PDCCH (E-PDCCH) in LTE) is described in Technical Specification (TS) 38.213 and is reproduced below for convenience:

For a search space set s associated with control resource set p, the CCEs for aggregation level L corresponding to PDCCH candidate $m_{n_{CI}}$ of the search space set for a serving cell corresponding to carrier indicator field value $n_{CI}$ are given by $$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i$$

where for any common search space, $Y_{p,k_p}=0$ for a WD-specific search space, $Y_{p,k_p}=(A_p \cdot Y_{p,k_p-1}) \bmod D$, $Y_{p,-1}=n_{RNTI} \neq 0$, $A_0=39827$, $A_1=39829$, $A_2=39839$, and $D=65537$.

$i=0, \ldots, L-1$.

$n_{CI}$ is the carrier indicator field value if the WD is configured with a carrier indicator field for the serving cell on which PDCCH is monitored; otherwise, including for any common search space, $n_{CI}$=0.

$N_{CCE,p}$ is the number of CCEs, numbered from 0 to $N_{CCE,p}-1$ in control resource set p;

$m_{n_{CI}}=0, \ldots, M_{p,n_{CI}}^{(L)}-1$, where $M_{p,n_{CI}}^{(L)}$ is the number of PDCCH candidates the WD is configured to monitor for aggregation level L for a serving cell and a search space set s corresponding to $n_{CI}$;

for any common search space, $M_{p,max}^{(L)}=M_{p,0}^{(L)}$;

for a WD-specific search space, $M_{p,max}^{(L)}$ is the maximum of $M_{p,n_{CI}}^{(L)}$ for all corresponding DCI formats over all configured $n_{CI}$ values for a CCE aggregation level L in control resource set p;

the RNTI value used for $n_{RNTI}$ may be defined in 3GPP Technical Specification (TS) 38.212 and in 3GPP TS 38.214.

Blind decoding of potential PDCCH transmissions may be attempted by the WD in each of the configured PDCCH candidates within a slot. The complexity incurred at the WD to do this may depend on the number of CCEs that are to be processed to test all the candidates in the CORESET. Channel estimation is a key contributor to the complexity incurred by the WD.

In order to manage the channel estimation complexity, limits on the total number of CCEs to be processed by the WD have been discussed. Limiting the number of CCEs to be monitored by the WDs can be achieved in multiple ways. One method may be to use a nested hashing function for different aggregation levels where the hashed CCEs for lower aggregation levels are always chosen from the set of CCEs used for PDCCH candidates at the highest aggregation level. Other solutions may include dropping some PDCCH candidates to be searched so that the total number of CCEs processed does not exceed the limit.

However, existing solutions may increase blocking probability, i.e., the probability that one or more of the CCEs corresponding to every viable PDCCH candidate for a WD overlap with the CCEs allocated to other WDs for transmission of their PDCCH.

SUMMARY

Some embodiments advantageously provide methods and apparatuses for configuring a search space to the WD based on a Control Channel Element (CCE) limit of the WD. Some embodiments provide for obtaining a control channel elements (CCE) limit for the WD; and determining at least one Physical Downlink Control Channel (PDCCH) candidate for the WD using the CCE limit.

Some embodiments of the present disclosure provide efficient methods to limit the number of CCEs to be processed by the WD for reception of the PDCCH while reducing the blocking probability between WDs as compared to the existing methods. Some of the embodiments disclosed may be summarized as follows:

Determination of the set of CCEs used for the candidates at all aggregation levels in a CORESET may be performed by incrementally accumulating the CCEs as per the current hashing function from the highest to the lowest aggregation level. If the CCE limit is reached at a given aggregation level, the candidates at that aggregation level and the lower aggregation levels may be re-hashed within the set of accumulated CCEs using a hashing function, which may in some aspects be one of: the current hashing function (based on for example LTE EPDCCH) and/or the hashing function used for the LTE PDCCH.

One embodiment may provide for the configuration of different CORESETs or search spaces to WDs based on their CCE processing capability. For example, WDs with a limit X for the number of CCEs that can be processed in a slot are assigned to a search space where the total number of CCEs in the search space is X or some function of X, while WDs with a limit Y may be configured with a different search space, accordingly. The physical CCEs for the two search spaces may overlap in some embodiments.

Methods are provided in some embodiments to split an overall channel estimation limit, X, per slot into a channel estimation limit that is applied per CORESET and such methods may include one or more of the following:

Dividing the channel estimation limit equally between the CORESETs;

Dividing the channel estimation limit evenly between the CORESETs with constraints;

Dividing the channel estimation limit between the CORESETs depending on the number of blind decode candidates assigned to each CORESET at each aggregation level;

Dividing the channel estimation limit between the CORESETs as a function of the number of CCEs in each CORESET,
  In direct proportion to the number of CCEs in each CORESET, and/or
  In direct proportion to the number of CCEs but with a constraint on the minimum number of CCEs to be processed for a CORESET;

Dividing the channel estimation limit between the CORESETs in proportion to the priorities configured to each CORESET; and Dropping some CORESETs and assigning the processing capability to the remaining CORESETs where the criterion for dropping CORESETs may be based on:
  CORESET size, and/or
  DCI formats assigned to the search spaces mapped to a CORESET.

Some advantages of methods and apparatuses described in this disclosure may include being able to accommodate complexity constraints at the WD in performing blind decoding. Some embodiments may reduce the blocking probability achieved compared to known methods while others may reduce the complexity in the network to accommodate the complexity constraints at the WD and may, in some embodiments, be without a significant impact on the blocking probability.

According to a first embodiment, there is provided a network node configured to communicate with a wireless device (WD), the network node configured to, and/or comprising a radio interface and/or comprising processing circuitry configured to configure a search space to the WD based on a Control Channel Element (CCE) limit of the WD.

According to one aspect of the first embodiment, the CCE limit of the WD corresponds to a processing capability limit of the WD and is related to a limit of a number of CCEs that the WD can process in a slot. In some embodiments, the processing circuitry is further configured to configure a second search space to a second WD based on a CCE limit of the second WD, the second search space being different from the first search space and the CCE limit of the second WD being different from the CCE limit of the first WD. In some embodiments, the processing circuitry is further configured to partition the processing capability limit of the WD between different search spaces, each search space being a control resource set (CORESET).

According to another embodiment, there is provided a method implemented in a network node, the method including configuring a search space to the WD based on a Control Channel Element (CCE) limit of the WD.

According to one aspect of this embodiment, the CCE limit of the WD corresponds to a processing capability limit of the WD and is related to a limit of a number of CCEs that the WD can process in a slot. In some embodiments, the method further includes configuring a second search space to a second WD based on a CCE limit of the second WD, the second search space being different from the first search space and the CCE limit of the second WD being different from the CCE limit of the first WD. In some embodiments, the method includes partitioning the processing capability limit of the WD between different search spaces, each search space being a control resource set (CORESET).

According to yet another embodiment, there is provided a wireless device (WD) configured to communicate with a network node, the WD configured to, and/or comprising a radio interface and/or processing circuitry configured to obtain a control channel elements (CCE) limit for the WD; and determine at least one Physical Downlink Control Channel (PDCCH) candidate for the WD using the CCE limit.

According to an aspect of this embodiment, the processing circuitry is configured to determine the at least one PDCCH candidate by: determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at at least one of the one of the plurality of aggregation levels and at least one aggregation level that is a lower aggregation level than the one of the plurality of aggregation levels. In some embodiments, the processing circuitry is configured to determine the at least one PDCCH candidate by applying a hashing function to the at least one PDCCH candidate within the CCE limit. In some embodiments, the CCE limit is based on a processing capability of the WD.

According to another embodiment, there is provided a method implemented in a wireless device (WD), the method including: obtaining a control channel elements (CCE) limit for the WD; and determining at least one Physical Downlink Control Channel (PDCCH) candidate for the WD using the CCE limit.

According to one aspect of this embodiment, the method may further include determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at at least one of the one of the plurality of aggregation levels and at least one aggregation level that is a lower aggregation level than the one of the plurality of aggregation levels. In some embodiments, the method may further include determining the at least one PDCCH candidate by applying a hashing function to the at least one PDCCH candidate within the CCE limit. In some embodiments, the CCE limit is based on a processing capability of the WD.

According to yet another embodiment, there is provided a network node, including a memory module configured to store a control channel element (CCE) limit; and a control channel module configured to configure a search space to the WD based on the CCE limit of the WD.

According to another embodiment, there is provided a wireless device, including a memory module configured to store a control channel element (CCE) limit; and a determination module configured to determine at least one Physical Downlink Control Channel (PDCCH) candidate for the WD using the CCE limit.

According to one aspect of the disclosure, a network node configured to communicate with a wireless device is provided. The network node includes processing circuitry configured to receive a Control Channel Element, CCE, limit of the wireless device and configure a search space for the wireless device to monitor based at least in part on the CCE limit of the wireless device.

According to one or more embodiments of this aspect, the CCE limit of the wireless device corresponds to a processing capability limit of the wireless device and is related to a limit of a number of CCEs that the wireless device can process in a slot. According to one or more embodiments of this aspect, the search space corresponds to a subset of a control resource set, CORESET. According to one or more embodiments of this aspect, the processing circuitry is further configured to determine that processing of a first CORESET and a second CORESET by the wireless device would exceed the CCE limit. The processing circuitry is further configured to drop the second CORESET from wireless device monitoring based at least in part on the determination that CCE limit would be exceeded.

According to another aspect of the disclosure, a method implemented in a network node is provided. A Control Channel Element, CCE, limit of the wireless device is received. A search space for the wireless device to monitor is configured based at least in part on the CCE limit of the wireless device.

According to one or more embodiments of this aspect, the CCE limit of the wireless device corresponds to a processing capability limit of the wireless device and is related to a limit of a number of CCEs that the wireless device can process in a slot. According to one or more embodiments of this aspect, the search space corresponds to a subset of a control resource set, CORESET. According to one or more embodiments of this aspect, the processing circuitry is further configured to determine that processing of a first CORESET and a second CORESET by the wireless device would exceed the CCE limit. The processing circuitry is further configured to drop the second CORESET from wireless device monitoring based at least in part on the determination that CCE limit would be exceeded.

According to another aspect of the disclosure, a wireless device configured to communicate with a network node is provided. The wireless device includes processing circuitry configured to monitor a search space for at least one Physical Downlink Control Channel, PDCCH, candidate where the search space is based at least in part on a control channel element, CCE, limit.

According to one or more embodiments of this aspect, the CCE limit is based on a CCE processing capability of the wireless device. According to one or more embodiments of this aspect, the processing circuitry is further configured to communicate the CCE limit of the wireless device. According to one or more embodiments of this aspect, the search space corresponds to a subset of a control resource set, CORESET. According to one or more embodiments of this aspect, the monitoring of the search space includes blind decoding at least one CCE for downlink control information, DCI associated with the wireless device. According to one or more embodiments of this aspect, the search space includes both a common search space and a wireless device specific search space within a first control resource set, CORESET. A second CORESET is dropped from monitoring by the wireless device based at least in part on the CCE limit.

According to another aspect of the disclosure, a method implemented in a wireless device is provided. The method comprises monitoring a search space for at least one Physical Downlink Control Channel, PDCCH, candidate where the search space is based at least in part on a Control Channel Element, CCE, limit.

According to one or more embodiments of this aspect, the CCE limit is based at least in part on a CCE processing capability of the wireless device. According to one or more embodiments of this aspect, the CCE limit of the wireless device is communicated. According to one or more embodiments of this aspect, the CCE limit is based at least in part on a CCE processing capability of the wireless device. According to one or more embodiments of this aspect, the search space corresponds to a subset of a control resource set, CORESET. According to one or more embodiments of this aspect, the monitoring of the search space includes blind decoding at least one CCE for downlink control information, DCI associated with the wireless device. According to one or more embodiments of this aspect, the search space includes both a common search space and a wireless device specific search space within a first control resource set, CORESET. A second CORESET is dropped from monitoring by the wireless device based at least in part on the CCE limit.

According to another embodiment, there is provided a host computer, including a communication module configured to at least one of observe, monitor, control, transmit, and receive information associated with any of the methods of the embodiments above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

Figure 1:
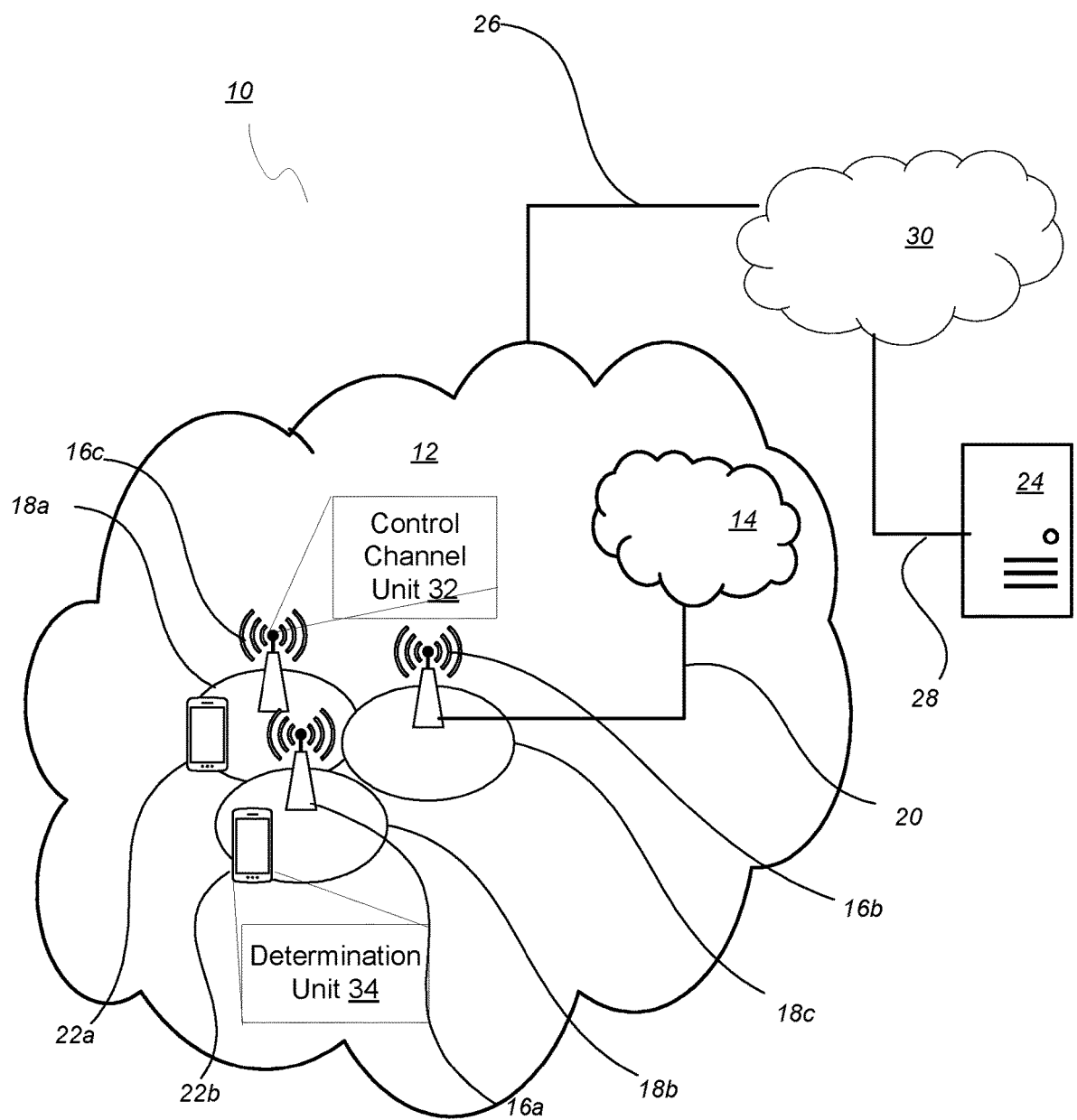
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to channel monitoring with complexity constraints. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present disclosure provide methods and apparatuses to limit the number of CCEs to be processed by the WD for reception of the PDCCH and may also include techniques for reducing the blocking probability between WDs as compared to existing methods.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a control channel unit 32 which is configured to configure a search space to the WD 22 based on a Control Channel Element (CCE) limit of the WD 22. A wireless device 22 is configured to include a determination unit 34 which is configured to obtain a control channel elements (CCE) limit for the WD 22, and determine at least one Physical Downlink Control Channel (PDCCH) candidate for the WD 22 using the CCE limit such as the CCE limit of WD 22. In one or more embodiments as used herein, obtaining a CCE limit may correspond to obtaining the CCE limit from memory 88 of WD 22. In one or more embodiments as used herein, the CCE limit of the WD 22 corresponds to a channel estimation of the WD 22, and vice versa.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a communication unit 54 configured to enable the service provider to observe/monitor/control/transmit to/receive from the network node 16 and/or the wireless device 22 for performing any of the methods or techniques described herein.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include control channel unit 32 configured to configure a search space to the WD 22 based on a Control Channel Element (CCE) limit of the WD 22. In some embodiments, the CCE limit of the WD corresponds to a processing capability limit of the WD and is related to a limit of a number of CCEs that the WD can process in a slot. In some embodiments, processing circuitry 68 is further configured to configure a second search space to a second WD based on a CCE limit of the second WD, the second search space being different from the first search space and the CCE limit of the second WD being different from the CCE limit of the first WD. In some embodiments, processing circuitry 68 is further configured to partition the processing capability limit of the WD between different search spaces, each search space being a control resource set (CORESET).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to obtain a control channel elements (CCE) limit for the WD 22; and determine at least one Physical Downlink Control Channel (PDCCH) candidate for the WD 22 using the CCE limit. In some embodiments, processing circuitry 84 is configured to determine the at least one PDCCH candidate by: determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at least one of the one of the plurality of aggregation levels and at least one aggregation level that is a lower aggregation level than the one of the plurality of aggregation levels. In some embodiments, processing circuitry 84 is configured to determine the at least one PDCCH candidate by applying a hashing function to the at least one PDCCH candidate within the CCE limit. In some embodiments, the CCE limit is based on a processing capability of the WD 22.

Figure 2:
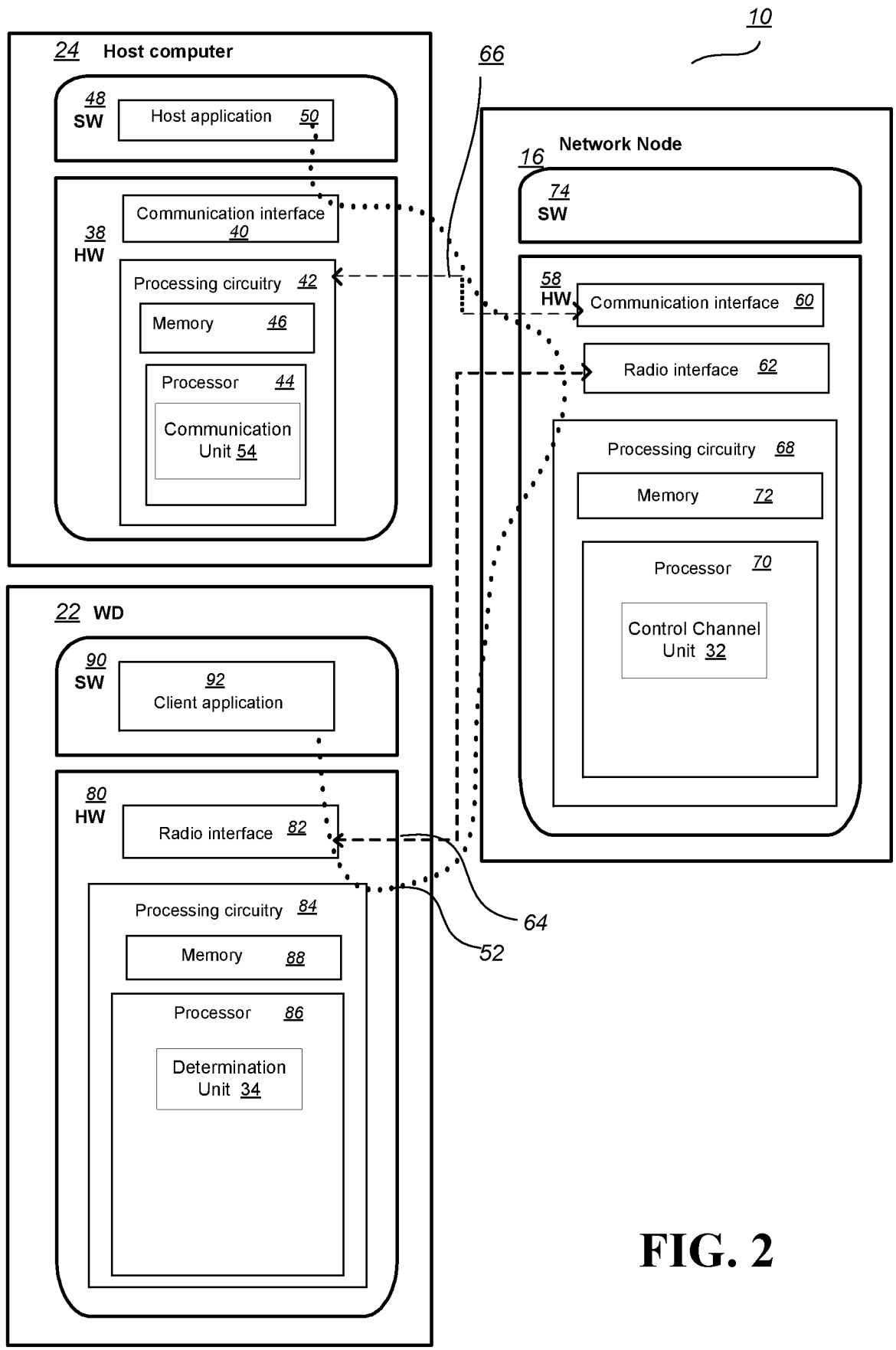
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as control channel unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
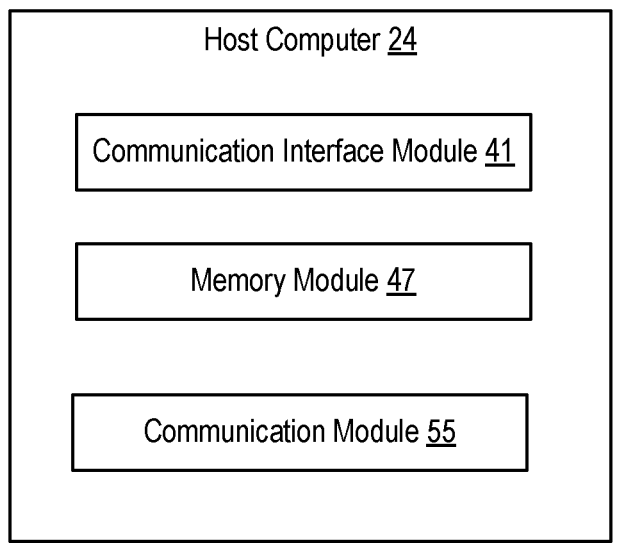
FIG. 3 is a block diagram of an alternative embodiment of a host computer according to some embodiments of the present disclosure.

FIG. 3 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Communication module 55 is configured to enable the service provider to observe/monitor/control/transmit to/receive from the network node 16 and/or the wireless device 22 for performing any of the methods or techniques described herein.

Figure 4:
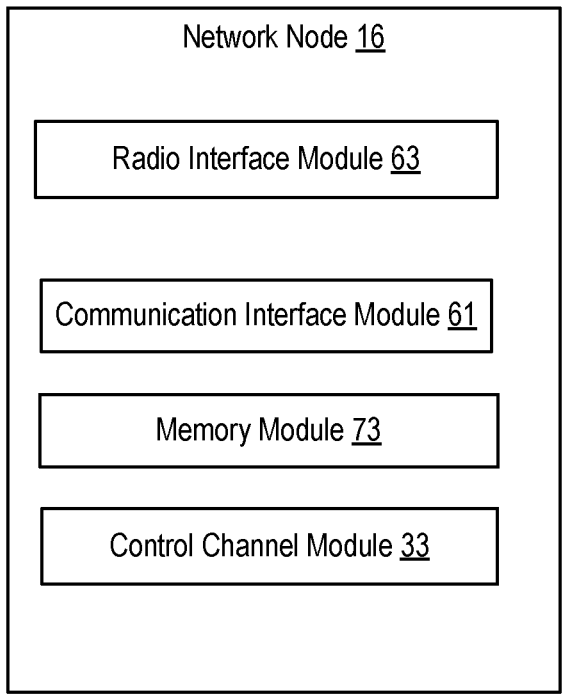
FIG. 4 is a block diagram of an alternative embodiment of a network node according to some embodiments of the present disclosure.

FIG. 4 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The control channel module 33 is configured to configure a search space to the WD 22 based on the CCE limit of the WD 22.

Figure 5:
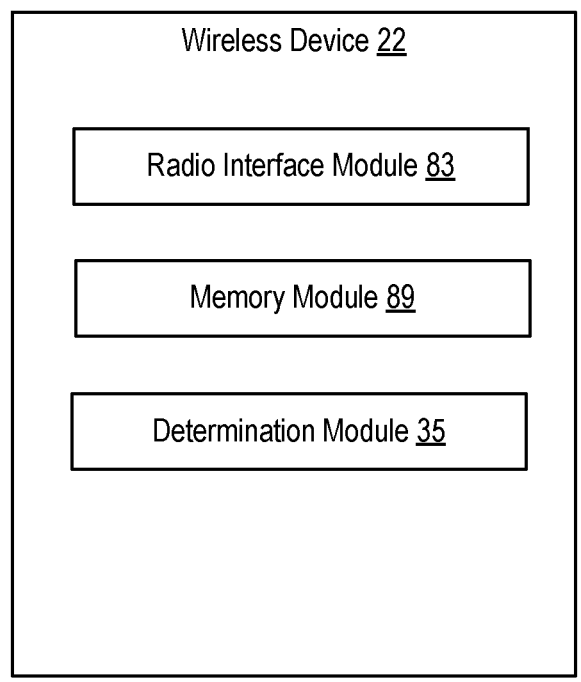
FIG. 5 is a block diagram of an alternative embodiment of a wireless device according to some embodiments of the present disclosure.

FIG. 5 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The determination module 35 is configured to determine at least one Physical Downlink Control Channel (PDCCH) candidate for the WD 22 using the CCE limit.

FIG. 6 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

FIG. 7 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 8 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 9 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 10:
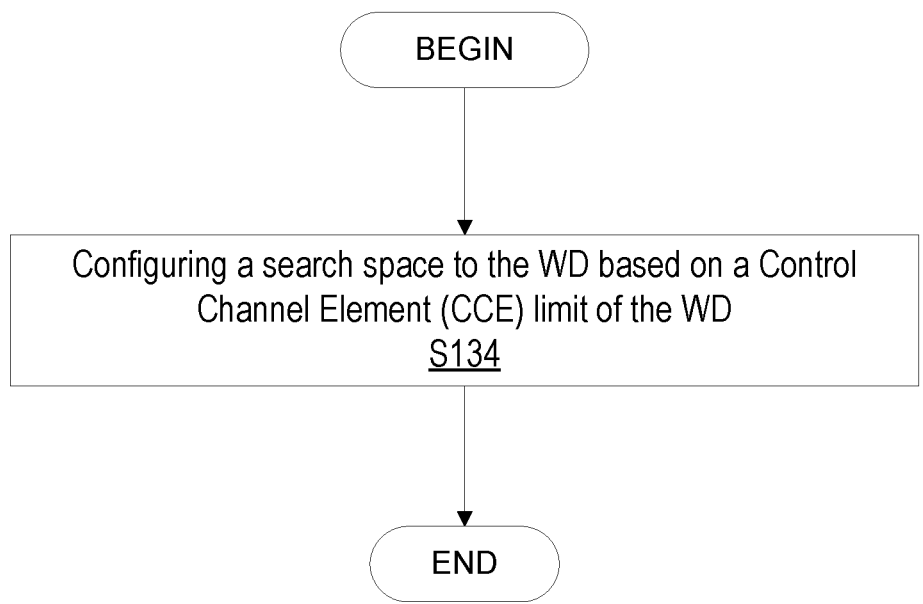
FIG. 10 is a flowchart of an exemplary process in a network node for control channel monitoring with complexity constraints according to some embodiments of the present disclosure.

FIG. 10 is a flowchart of an exemplary process in a network node 16 for configuring a search space to the WD 22 based on a Control Channel Element (CCE) limit of the WD 22 (block S134). In some embodiments, the CCE limit of the WD 22 corresponds to a processing capability limit of the WD and is related to a limit of a number of CCEs that the WD can process in a slot. In some embodiments, the method further includes configuring a second search space to a second WD 22 based on a CCE limit of the second WD 22, the second search space being different from the first search space and the CCE limit of the second WD 22 being different from the CCE limit of the first WD 22. In some embodiments, the method may include partitioning the processing capability limit of the WD 22 between different search spaces. Each search space may be a control resource set (CORESET).

Figure 11:
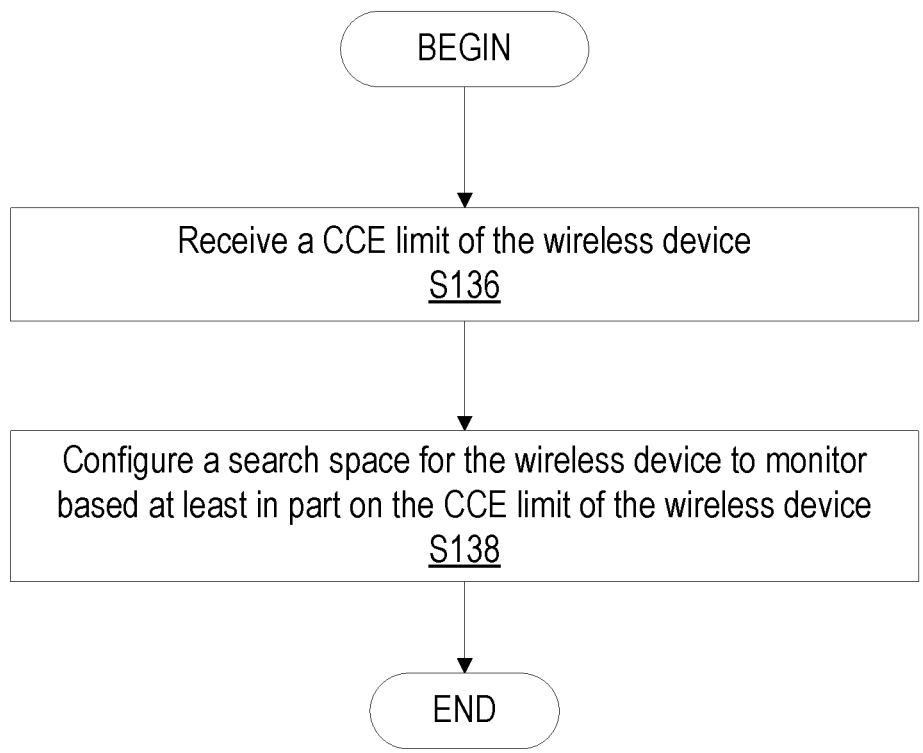
FIG. 11 is a flowchart of another exemplary process in a network node for control channel monitoring with complexity constraints according to some embodiments of the present disclosure.

FIG. 11 is a flowchart of another exemplary process in a network node 16 for configuring a search space. One or more Blocks and/or functions performed by network node 16 may be performed by one or more elements of network node 16 such as by control channel unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to receive (block S136) a Control Channel Element, CCE, limit of the wireless device, as described herein. In one or more embodiments, the CCE limit of the wireless device 22 may be received during initial communications between the wireless device 22 and the network node 16 such as during a random access procedure and/or registration. In one or more embodiments, network node 16 such as via one or more of processing circuitry 68, processor 70, radio interface 62 and communication interface 60 is configured to configure (block S138) a search space for the wireless device to monitor based at least in part on the CCE limit of the wireless device, as described herein.

According to one or more embodiments, the CCE limit of the wireless device corresponds to a processing capability limit of the wireless device 22 and is related to a limit of a number of CCEs that the wireless device 22 can process in a slot. According to one or more embodiments, the search space corresponds to a subset of a control resource set, CORESET. According to one or more embodiments, the processing circuitry 68 is further configured to determine that processing of a first CORESET and a second CORESET by the wireless device 22 would exceed the CCE limit. The processing circuitry 68 is further configured to drop the second CORESET from wireless device 22 monitoring based at least in part on the determination that CCE limit would be exceeded.

Figure 12:
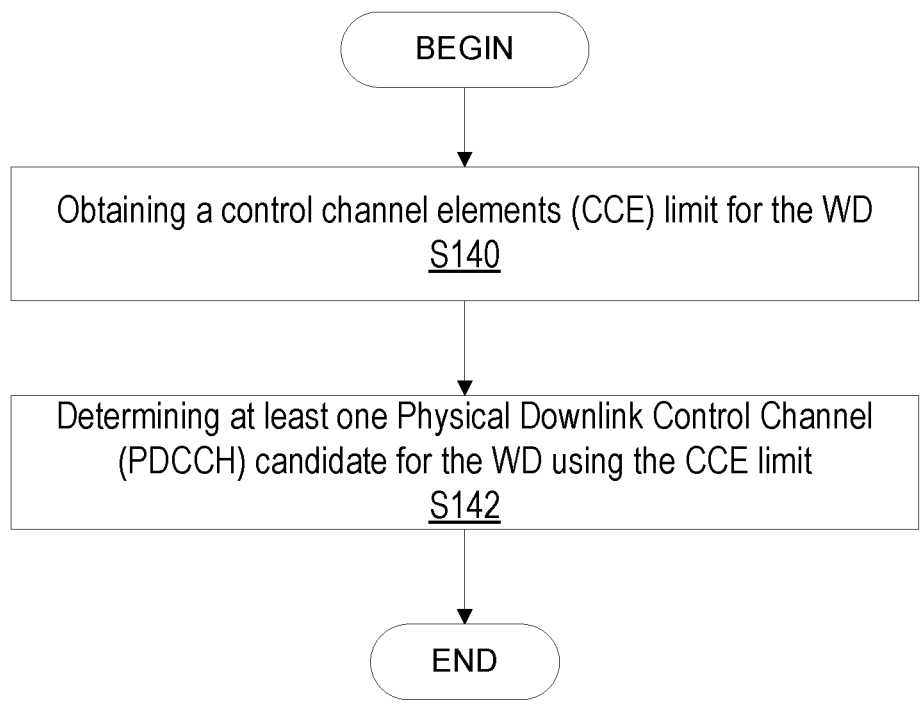
FIG. 12 is a flowchart of an exemplary process in a wireless device for control channel monitoring with complexity constraints according to some embodiments of the present disclosure.

FIG. 12 is a flowchart of an exemplary process in a wireless device 22 according to some embodiments of the present disclosure. The process may include obtaining a control channel elements (CCE) limit for the WD 22 (block S140); and determining at least one Physical Downlink Control Channel (PDCCH) candidate for the WD 22 using the CCE limit (block S142). In some embodiments, the process may include determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at least one of the one of the plurality of aggregation levels and at least one aggregation level that is a lower aggregation level than the one of the plurality of aggregation levels. In some embodiments, the process may include determining the at least one PDCCH candidate by applying a hashing function to the at least one PDCCH candidate within the CCE limit. In some embodiments, the CCE limit is based on a processing capability of the WD 22.

Figure 13:
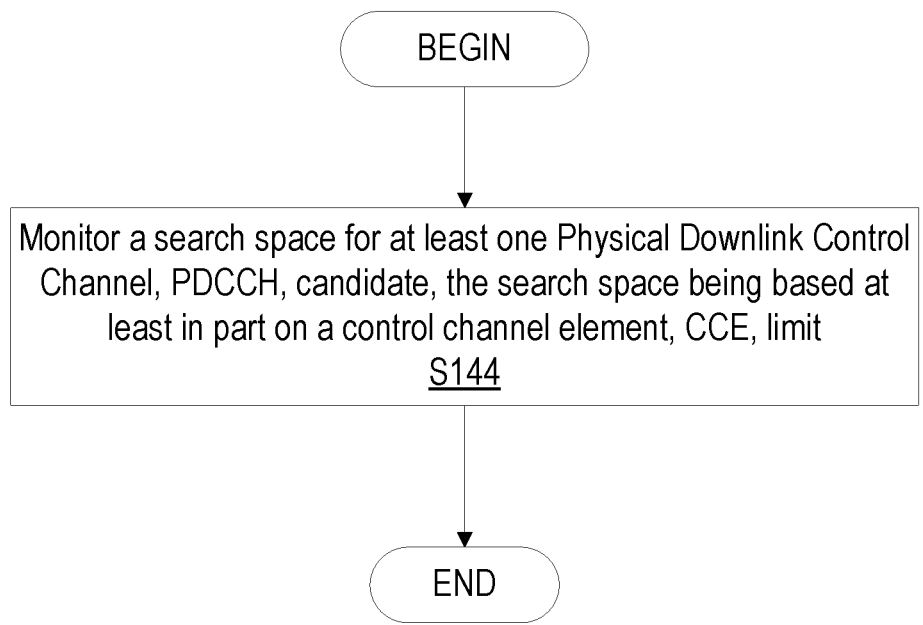
FIG. 13 is a flowchart of another exemplary process in a wireless device for control channel monitoring with complexity constraints according to some embodiments of the present disclosure.

FIG. 13 is a flowchart of another exemplary process in a wireless device 22 according to some embodiments of the present disclosure. One or more Blocks and/or functions performed by wireless device 22 may be performed by one or more elements of wireless device 22 such as by determination unit 34 in processing circuitry 84, processor 86, radio interface 82, etc. In one or more embodiments, wireless device 22 such as via one or more of processing circuitry 84, processor 86 and radio interface 82 is configured to monitor (block S144) a search space for at least one Physical Downlink Control Channel, PDCCH, candidate where the search space is based at least in part on a control channel element, CCE, limit, as described herein.

According to one or more embodiments of this aspect, the CCE limit is based on a CCE processing capability of the wireless device 22. According to one or more embodiments of this aspect, the processing circuitry 84 is further configured to communicate the CCE limit of the wireless device 22. According to one or more embodiments of this aspect, the search space corresponds to a subset of a control resource set, CORESET. According to one or more embodiments of this aspect, the monitoring of the search space includes blind decoding at least one CCE for downlink control information, DCI associated with the wireless device 22. According to one or more embodiments of this aspect, the search space includes both a common search space and a wireless device 22 specific search space within a first control resource set, CORESET. A second CORESET is dropped from monitoring by the wireless device 22 based at least in part on the CCE limit.

Having generally described embodiments of the present disclosure, a more detailed description of some of the embodiments are provided below.

Determination of PDCCH Candidates within a CORESET with an Assigned CCE Processing Limit According to a first embodiment of the present disclosure, in order to determine the PDCCH candidates within a CORESET for which there may be a limit on the CCE processing capability from a channel estimation perspective, there may be at least two approaches that may be taken.

In a first approach of this embodiment, a subset of the CCEs in the CORESET equal to the CCE processing limit may be chosen to form a CCE footprint and PDCCH candidates at different aggregation levels may be determined by applying a hashing function within the CCE footprint.

In a second approach of this embodiment, a hashing function applied on the CCEs of the CORESET may be used to determine a set of PDCCH candidates in the CORESET. Then, a set of PDCCH candidates may be dropped, if necessary to ensure that the total number of CCEs processed across all the candidates is within the CCE limit.

The terms candidate and PDCCH candidates may be used interchangeably and are intended to indicate PDCCH candidates. In some embodiments, the WD 22 may monitor a set of downlink resources for possible DCI transmission and, if a valid DCI is detected (e.g. a downlink assignment or an uplink grant or command type message), it follows the content of the DCI. Such monitoring may, in some embodiments, be considered as blind decoding, in which the WD 22 is trying, for different combinations of DCI sizes and formats, to decode a PDCCH candidate possibly containing valid DCI.

The following description provides methods and techniques to potentially improve the performance of both approaches mentioned above as well as other approaches.

Methods for Determining a CCE Footprint that does not Exceed the CCE Limit and Hashing Candidate within the CCE Footprint In this set of embodiments, none of the blind decode PDCCH candidates that were assigned to the WD 22 for the CORESET are dropped. Instead, a CCE footprint that equals the CCE limit may be determined and PDCCH candidates are hashed within this CCE footprint so that the CCE limit is not exceeded.

Figure 14:
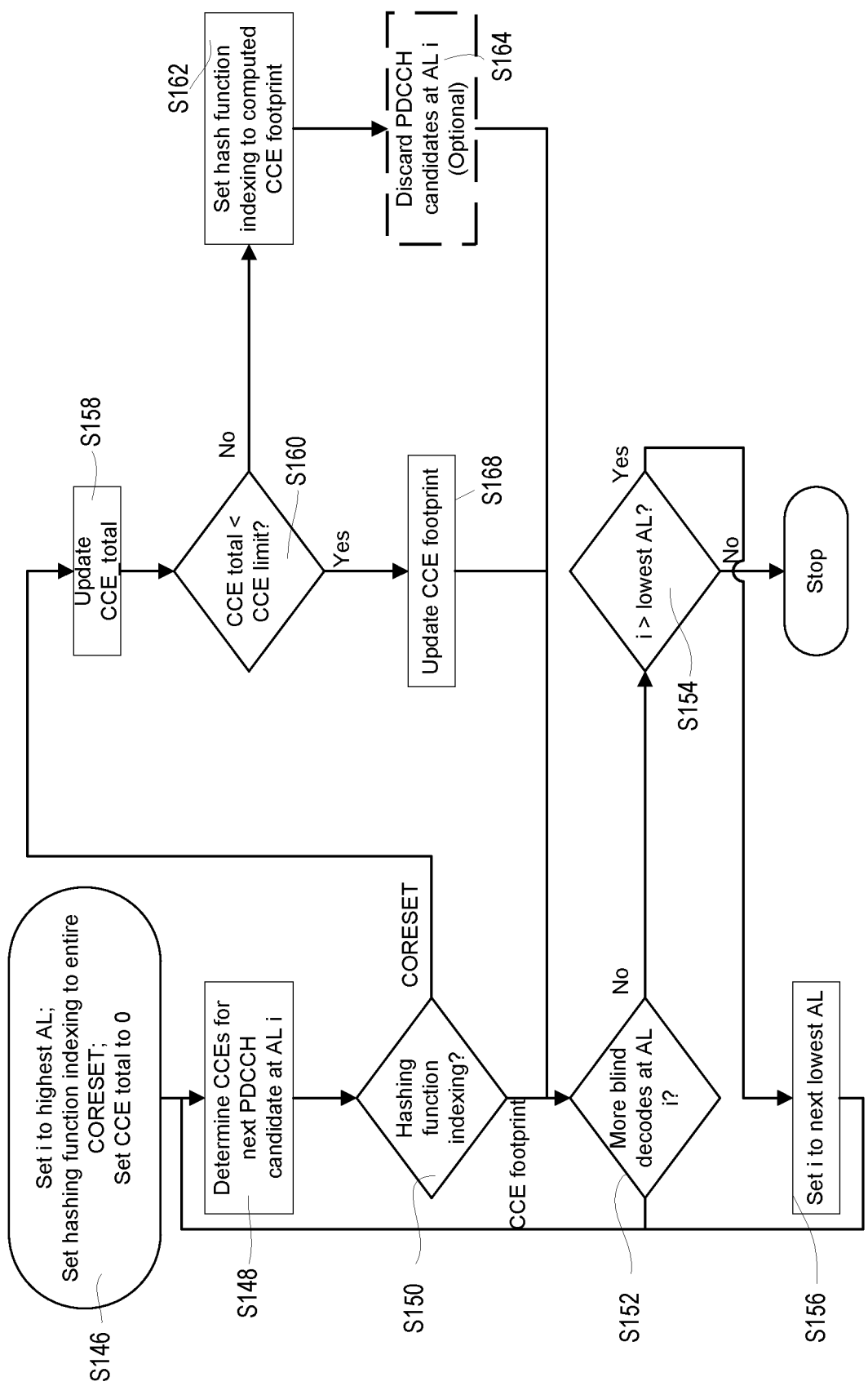
FIG. 14 is a flow diagram illustrating an exemplary procedure for determination of CCE footprint via hashing on the CORESET and hashing remaining candidates within the CCE footprint according to one embodiment of the present disclosure.

Determination of CCE Footprint Via Hashing on the CORESET on One or More Aggregation Levels Until the CCE Limit is Reached and Hashing Remaining Candidates within the CCE Footprint In this embodiment, PDCCH candidates are determined in decreasing order of aggregation levels, by using a hashing function that applies over the entire CORESET. As new candidates are added to the set of candidates, the total CCE footprint of the determined candidates may be computed by, for example, the WD 22. When a PDCCH candidate causes the total CCE footprint to exceed the CCE limit, such PDCCH candidate and other candidates at this and lower aggregation levels may be hashed under the footprint computed based on the candidates already determined up to this point at this and higher aggregation levels. An example of this detailed procedure is shown in FIG. 14. In one or more embodiments, wireless device 22 such as via one or more of processing circuitry 84, processor 86 and radio interface 82 is configured to set (block s146) i to a highest aggregation level (AL), set hashing function indexing to an entire CORESET and set the CCE total to 0, as described herein. In one or more embodiments, wireless device 22 such as via one or more of processing circuitry 84, processor 86 and radio interface 82 is configured to determine (block s148) CCEs for a next PDCCH candidate at AL ī, as described herein.

In one or more embodiments, wireless device 22 such as via one or more of processing circuitry 84, processor 86 and radio interface 82 is configured to determine (block s150) whether a hashing function indexing should be implemented, as described herein. In one or more embodiments, wireless device 22 such as via one or more of processing circuitry 84, processor 86 and radio interface 82 is configured to, if hashing function indexing is implemented, determine (block s152) whether there are more blind decodes at AL i, as described herein. If there are more blind decodes at AL i, the process may return to block S148. In one or more embodiments, wireless device 22 such as via one or more of processing circuitry 84, processor 86 and radio interface 82 is configured to, if there are not more blind decodes in AL i, determine (block S154) whether i is greater than a lowest AL, as described herein. If i is not greater than a lowest AL, the process may stop. In one or more embodiments, wireless device 22 such as via one or more of processing circuitry 84, processor 86 and radio interface 82 is configured to, if i is greater than a lowest AL, set (block S156) i to the next lowest AL, as described herein.

Referring back to block S150, if the hashing function is not implemented, In one or more embodiments, wireless device 22 such as via one or more of processing circuitry 84, processor 86 and radio interface 82 is configured to update (block S158) the CCE total (CCE_total), as described herein. In one or more embodiments, wireless device 22 such as via one or more of processing circuitry 84, processor 86 and radio interface 82 is configured to determine (block S160) if the CCE total is less than the CCE limit, as described herein. In one or more embodiments, wireless device 22 such as via one or more of processing circuitry 84, processor 86 and radio interface 82 is configured to set (block S162) a has function indexing to the computed CCE footprint, as described herein. In one or more embodiments, wireless device 22 such as via one or more of processing circuitry 84, processor 86 and radio interface 82 is configured to discard (block S164) PDCCH candidates at AL i, as described herein. In one or more embodiments, block S164 may be omitted or skipped. After block S164, the process may proceed to Block S152.

Referring back to S160, in one or more embodiments, wireless device 22 such as via one or more of processing circuitry 84, processor 86 and radio interface 82 is configured to, if the CCE total is less than the CCE limit, update (block S168) the CCE footprint, as described herein. In one or more embodiments, wireless device 22 such as via one or more of processing circuitry 84, processor 86 and radio interface 82 is configured to, after block S168, perform the determination of block S152.

In some embodiments, when the CCE limit is reached, the candidates that have already been determined at the current aggregation level may either be retained or discarded. If these hashing candidates are discarded these candidates may be determined again by hashing within the CCE footprint that has been computed.

While any hashing function can be used as a part of this embodiment, an example of a hashing function that can be used is a variation of the one currently in the NR Rel-15 specification. The description in 3GPP TS 38.213 is reproduced below for convenience.

For a search space set s associated with a control resource set (CORESET) p, the CCEs corresponding to PDCCH candidate $m_{n_{CI}}$ at aggregation level L of the search space for a serving cell corresponding to carrier indicator field value $n_{CI}$ are given by $$L \cdot \left\{ \left( Y_{p,n_{s,f}^\mu} + \left\lfloor \frac{m_{n_{CI}} \cdot N_{CCE,p}}{L \cdot M_{p,max}^{(L)}} \right\rfloor + n_{CI} \right) \mod \lfloor N_{CCE,p}/L \rfloor \right\} + i, \quad (1)$$

where for any common search space, $Y_{p,n_{s,f}^\mu}=0$; for a WD-specific search space, $Y_{p,n_{s,f}^\mu}=(A_p \cdot Y_{p,n_{s,f}^\mu-1}) \mod D$. The other parameters may be the same as described above.

Figure 15:
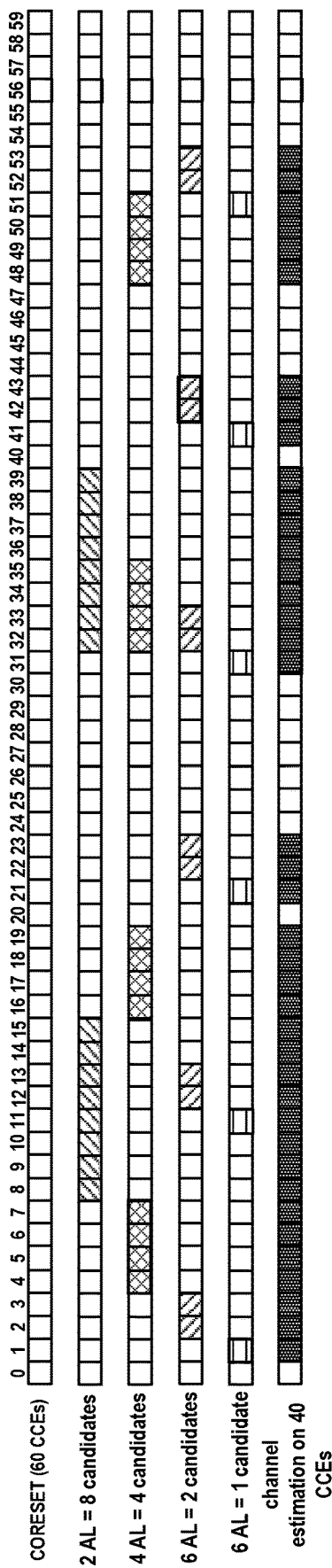
FIG. 15 is schematic diagram of an exemplary determination of the CCE footprint according to one embodiment.

One exemplary procedure for determination of the CCE footprint may be described using FIG. 15. As used herein with respect to one or more figures, like elements are denoted by like hatching styles while different elements are denoted by different hatching styles. FIG. 15 shows how the candidates are determined for different aggregation levels without any limitations on the number of CCEs that can be processed by e.g., WD 22, for channel estimation. As can be seen, FIG. 15 shows that the final CCE footprint including the CCEs corresponding to all the aggregation levels is 40 CCEs in the example. The candidates for each aggregation level and the final CCE footprint are shown in FIG. 15.

Figure 16:
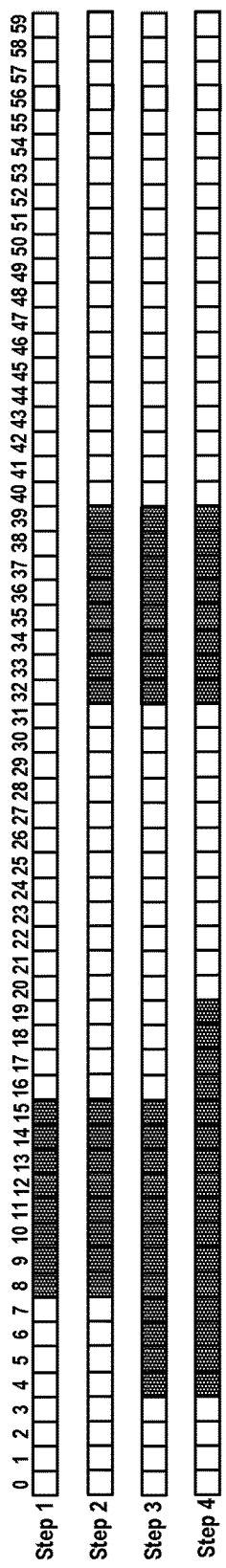
FIG. 16 is another schematic diagram of an exemplary determination of the CCE footprint according to one embodiment.
Figure 17:
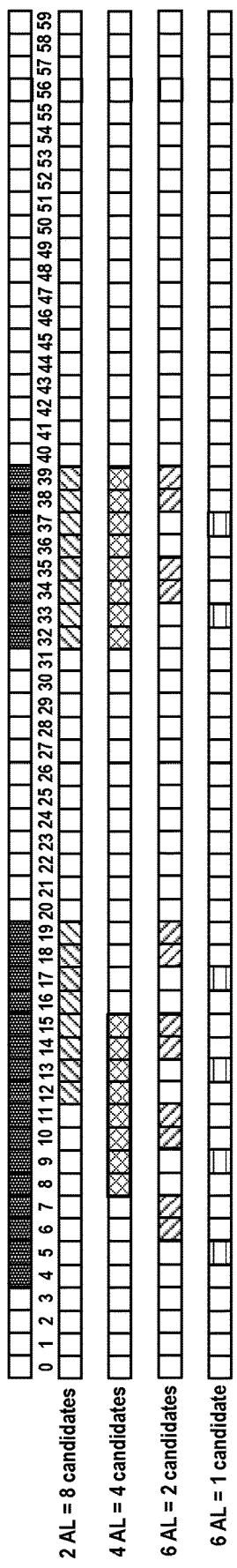
FIG. 17 is a schematic diagram of an example of PDCCH determination according to the procedures in another embodiment (the example has a CORESET of 60 CCEs with 6/6/4/2 candidates at aggregation levels 1/2/4/8)

In FIG. 16, the CCE footprint that is computed as part of this embodiment when the CCE limit is 24 CCEs is shown, i.e., if the wireless device 22 may only perform channel estimation on 24 CCEs. As can be seen, the CCE footprint is determined based on the 2 aggregation level 8 candidates and 2 of the 4 aggregation level 4 candidates. After the CCEs for the second aggregation level 4 candidate, the CCE limit of 24 CCEs is reached. Therefore, all the candidates at aggregation level 4 and lower are re-hashed within the CCE footprint of 24 CCEs shown after step 4 in FIG. FIG. 16. In particular, in step 1, the footprint size is equal to 8 CCEs. In step 2, the footprint size is equal to 16 CCEs. In step 3, the footprint size is equal to 20 CCEs. In step 4, the footprint size is equal to 24 CCEs. The resulting candidates at all aggregation levels as computed according to the procedure in this embodiment are shown for example in FIG. 17. It should be noted that in the example depicted in FIGS. 13 and 14, aggregation level 8 candidates are not restricted by the WD 22 channel estimation capability since all of its candidates are added into the CCE footprint; candidates of all other candidates are restricted in the example.

Determination of CCE Footprint Via Hashing on the CORESET at the Highest Aggregation Level with the Number of Candidates Used to Reach the CCE Limit and Hashing Remaining Candidates within the CCE Footprint This set of embodiments may vary from some the embodiment described above in that the CCE footprint may be entirely determined by performing hashing on the entire CORESET at the highest aggregation level. If the number of CCEs occupied by the candidates assigned for blind decoding at the highest aggregation level is less than the CCE limit, so-called pseudo-candidates at the highest aggregation level may be added until the number of occupied CCEs across the PDCCH candidates and the pseudo-candidates reaches the highest value possible that is less than or equal to the CCE limit. All of the candidates at all aggregation levels may then be hashed within the computed CCE footprint.

As explained above, any hashing function can be used for this embodiment. An example of an alternate hashing function that could be used for this embodiment and for other embodiment described herein that use a hashing function, is a function that randomly chooses and/or selects $M_{p,n_{CI}}^{(L)}$ candidates from the $\lfloor N_{CCE,p}/L \rfloor$ candidates at aggregation level L.

Determination of CCE Footprint Via Hashing on the CORESET at the Highest Aggregation Level with the Number of Candidates Used to Reach the CCE Limit and Hashing the Remaining Candidates within the CCE Footprint with a Different Hashing Function In some of the embodiments discussed above, the hashing function is described as being used throughout the procedures as being the same. In this embodiment, the hashing function used for determining the CCE footprint may be different from the hashing function used to determine the CCEs for the PDCCH candidates under the CCE footprint. For instance, the hashing function in equation (1) above may be used to determine the CCE footprint while a different hashing function may be used to determine the candidates under the CCE footprint. One example of such a different hashing function is a function that randomly selects $M_{p,n_{CI}}^{(L)}$ candidates from the $\lfloor N_{CCE,p}/L \rfloor$ possible candidates at aggregation level L.

Figure 18:
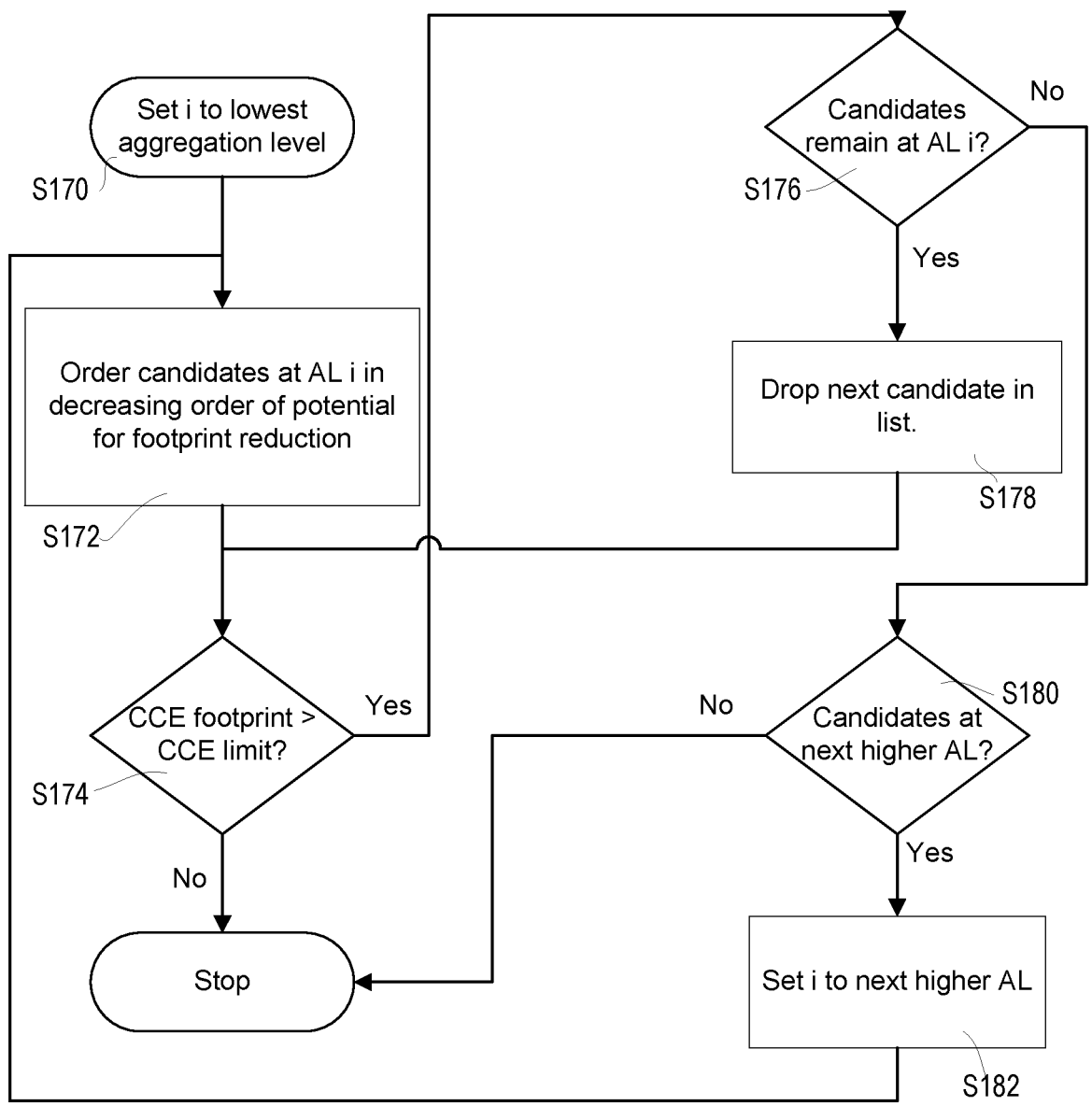
FIG. 18 is a flow diagram of another exemplary procedure for dropping of PDCCH candidates in increasing order of aggregation levels and decreasing order of potential for CCE footprint reduction

Methods for Dropping of PDCCH Candidates to Ensure that the CCE Limit is not Exceeded Dropping of Candidates in Increasing Order of Aggregation Levels and Decreasing Order of Potential CCE Footprint Reduction In this embodiment, candidates may be dropped starting at the lowest aggregation level. At each aggregation level, candidates may be ordered in decreasing order of potential for CCE footprint reduction if the candidate is dropped. In some embodiments, a candidate is dropped only if dropping the candidate reduces the overall CCE footprint occupied by all currently remaining PDCCH candidates in the CORESET for the WD 22. One example of a detailed procedure is described with reference to FIG. 14. FIG. 18 is illustrates another exemplary procedure according to embodiments of the present disclosure for dropping PDCCH candidates in increasing order of aggregation levels and decreasing order of potential for CCE footprint reduction.

In one or more embodiments, wireless device 22 such as via one or more of processing circuitry 84, processor 86 and radio interface 82 is configured to set (block S170) i to a lowest aggregation level, as described herein. In one or more embodiments, wireless device 22 such as via one or more of processing circuitry 84, processor 86 and radio interface 82 is configured to order (block S172) candidates at AL i in decreasing order of potential for footprint reduction, as described herein. In one or more embodiments, wireless device 22 such as via one or more of processing circuitry 84, processor 86 and radio interface 82 is configured to determine (block S174) whether the CCE footprint is greater than the CCE limit of the wireless device 22, as described herein.

In one or more embodiments, wireless device 22 such as via one or more of processing circuitry 84, processor 86 and radio interface 82 is configured to, if the CCE footprint is not greater than the CCE limit, stop the process of FIG. 18. In one or more embodiments, wireless device 22 such as via one or more of processing circuitry 84, processor 86 and radio interface 82 is configured to, if the CCE footprint is greater than the CCE limit, determine (block S176) whether candidates remain at AL i, as described herein. In one or more embodiments, wireless device 22 such as via one or more of processing circuitry 84, processor 86 and radio interface 82 is configured to, if the determination is made that candidates remain at AL i, drop (block S178) a next candidate in the list, as described herein. In one or more embodiments, wireless device 22 such as via one or more of processing circuitry 84, processor 86 and radio interface 82 is configured to, after block S178, perform the determination of block S174.

Referring back to block S176, in one or more embodiments, wireless device 22 such as via one or more of processing circuitry 84, processor 86 and radio interface 82 is configured to, if the determination is made that there are no candidates remain at AL i, determine (block S180) whether candidates at a next higher AL remain, as described herein. In one or more embodiments, wireless device 22 such as via one or more of processing circuitry 84, processor 86 and radio interface 82 is configured to, if there a no remaining candidates at a next higher AL, stop the process of FIG. 15. In one or more embodiments, wireless device 22 such as via one or more of processing circuitry 84, processor 86 and radio interface 82 is configured to, if there remain candidates at a next higher AL, set (block S182) i to the next higher AL, as described herein. In one or more embodiments, wireless device 22 such as via one or more of processing circuitry 84, processor 86 and radio interface 82 is configured to, after block S182, perform the determination of block S172.

Configuration of Different CORESETs or Search Spaces for Different WDs Based on the CCE Processing Capability of the WD(s)

In this embodiment, WDs 22 may be categorized into groups, by for example the network node 16 and/or the WD 22, based on their respective CCE processing capability. CORESETs may be configured, by for example the network node 16 and/or the WD 22, such that all the WDs 22 in the same CORESET have the same limits on the number of CCEs that can be processed in a slot for channel estimation. The CORESETs configured for these different groups may overlap, i.e., they may use the same time and frequency resources.

Partitioning the CCE Processing Capability Per Slot Between Different CORESETs to be Monitored by the WD in the Slot In this embodiment, a WD 22 may be assigned multiple search spaces to monitor in a slot that may be mapped to more than one CORESET occurring in the slot. In such a situation, if the total number of CCEs to be processed in the slot across all of the configured CORESETs exceeds the CCE processing limit, X, for the slot, as per this set of embodiments, the CCE processing limit may be partitioned among the configured CORESETs such that $$X = \sum_{i=0}^{N-1} X_i$$

where $X_i$ is the CCE processing limit for CORESET i and N is the number of CORESETs configured to the WD 22.

Various methods to partition the CCE processing capability per slot between CORESETs to be monitored by the WD 22 in a slot are described for this set of embodiments below.

Dropping or Protecting Some CORESETs and Assigning the Remaining Processing Capability to the Remaining CORESETs In this embodiment, some CORESETs may be protected so that there is no reduction in the blind decoding capability for some search spaces in these CORESETs. Specifically, a CORESET carrying a common search space may be assigned a CCE processing capability that is at least as high as the number of CCEs needed to be processed to monitor all the blind decodes in the common search space mapped to the CORESET. CORESETs that are known to be configured for low latency services, such as those with monitoring periodicity more frequent than once per slot, may also be similarly treated.

In another aspect of this embodiment, some CORESETs may be entirely dropped when the CCE processing capability is less than the total number of CCEs that may be used to perform all the blind decodes configured to the WD 22 for the slot. Specifically, in some embodiments, when the WD 22 is configured with two CORESETs, one mapped to a common search space and a WD-specific search space while the other CORESET is configured with only a WD-specific search space for DCI formats with Cyclic Redundancy Check (CRC) scrambled by Radio Network Temporary Identifiers (RNTIs) already being monitored in other CORESETs, the WD-specific search space may be dropped.

Dividing the CCE Processing Limit Equally Between the CORESETs

In this embodiment, the CCE processing limit may be equally partitioned between the CORESETs to be monitored within the slot so that the processing limit for CORESET i is given by $$X_i = \left\lfloor \frac{X}{N} \right\rfloor$$

where $X_i$ is the CCE processing limit for CORESET i.

Dividing the CCE Processing Limit Between the CORESETs Depending on the Number of Bind Decode Candidates Assigned to Each CORESET at Each Aggregation Level In this embodiment, the CCE processing capacity may be distributed among CORESETs based on the number of blind decode candidates assigned to each CORESET at each aggregation level. This may be performed as follows. First, a function, $Y_i$, of the number of blind decodes at various aggregation levels is computed for each CORESET i across all search spaces assigned to this CORESET.

$$Y_i = \Sigma_l B_i^l \cdot l, l \in \{1,2,4,8,16\},$$

where $B_i^l$ is the number of blind decodes assigned to aggregation level l for CORESET i. The CCE processing limit, $X_i$, for CORESET i is then calculated as $$X_i = \left\lfloor X \cdot \frac{Y_i}{\Sigma_i Y_i} \right\rfloor.$$

Dividing the CCE Processing Limit Between the CORESETs as a Function of the Number of CCEs in Each CORESET In this embodiment, the CCE processing capacity may be distributed in proportion to the number of CCEs in each CORESET. The CCE processing limit, $X_i$, for CORESET i may be calculated as $$X_i = \left\lfloor X \cdot \frac{N_i^{CCE}}{\Sigma_i N_i^{CCE}} \right\rfloor,$$

where $N_i^{CCE}$ is the number of CCEs assigned to CORESET i.

Dividing the CCE Processing Limit Between the CORESETs in Proportion to the Priorities for Each CORESET In this embodiment, the WD 22 may be configured with priorities for each CORESET in a slot and the CCE processing limit may be distributed in proportion to these priorities.

The CCE processing limit, $X_i$, for CORESET i may then calculated as $$X_i = \left\lfloor X \cdot \frac{P_i}{\Sigma_i P_i} \right\rfloor.$$

where $P_i$ is the priority for CORESET i. The priorities may be obtained in multiple ways. In one embodiment, the priority for the CORESET is directly configured to the WD 22 via Radio Resource Control (RRC) signaling from a network node 16. In another embodiment, the priority for each search space mapped to the CORESET is configured via RRC signaling from the network node 16. In this case, the priority for CORESET i, $P_i$, may simply be obtained as the sum of the priority numbers assigned to each search space mapped to the CORESET.

In another embodiment, the priority numbers may be determined by the WD 22 according to some pre-defined rules. Some examples of the rules that may be used in any combination are provided below.

Dividing the Channel Estimation Limit Between the CORESETs with Constraints

The embodiments above, in some cases, could assign more CCE processing capacity to a CORESET than the number of CCEs in the CORESET. Some of the embodiments described below may place some constraints on the assignment of CORESETs to avoid this.

In this embodiment, the following procedure may be used to partition the CCE processing limitation across the different CORESETs. A variation of the procedure in the previously described embodiment corresponding to dropping or protecting some CORESETs and assigning the remaining processing capability to the remaining CORESETs may, in some aspects, be used as a first step in this embodiment.

Let $X^j$ denote the number of remaining CCE capacity that may be assigned at the start of iteration j of the procedure and $X_i^j$ the CCE capacity assigned to CORESET i at the start of iteration j. At the start of the procedure, $X^0 = X$, i.e., the number of remaining CCEs may be the total CCE processing capacity of the WD 22. At each iteration j, the CCE processing capacity of each CORESET may be modified as follows $$X_i^{(j+1)} = \min(N_i^{CCE}, X_i^j + f(X^j)),$$

where $N_i^{CCE}$ is the number of CCEs assigned to CORESET i and $f(X^j)$ is $X_i$ as computed by any of the previous embodiments, with the CCE processing limit, X, set to $X^j$. The procedure may stop when the CCE capacity assigned to all the CORESETs remains unchanged between successive iterations, i.e., $$X_i^j = X_i^{(j+1)}, \forall i.$$

Some examples are provided below:

Example 1. A network node 16 configured to communicate with a wireless device 22 (WD 22), the network node 16 configured to, and/or comprising a radio interface 62 and/or comprising processing circuitry 68 configured to configure a search space to the WD 22 based on a Control Channel Element (CCE) limit of the WD 22.

Example 2. The network node 16 of Example 1, wherein the CCE limit of the WD 22 corresponds to a processing capability limit of the WD 22 and is related to a limit of a number of CCEs that the WD 22 can process in a slot.

Example 3. The network node 16 of any of Examples 1-2, wherein the processing circuitry 68 is further configured to configure a second search space to a second WD 22 based on a CCE limit of the second WD 22, the second search space being different from the search space and the CCE limit of the second WD 22 being different from the CCE limit of the WD 22.

Example 4. The network node 16 of any of Examples 2-3, wherein the processing circuitry 68 is further configured to partition the processing capability limit of the WD 22 between different search spaces, each search space being a control resource set (CORESET).

Example 5. A method implemented in a network node 16, the method comprising configuring a first search space to a WD based on a Control Channel Element (CCE) limit of the WD.

Example 6. The method of Example 5, wherein the CCE limit of the WD 22 corresponds to a processing capability limit of the WD and is related to a limit of a number of CCEs that the WD 22 can process in a slot.

Example 7. The method of any of Examples 5-6, further comprising configuring a second search space to a second WD 22 based on a CCE limit of the second WD 22, the second search space being different from the search space and the CCE limit of the second WD 22 being different from the CCE limit of the WD 22.

Example 8. The method of any of Examples 6-7, further comprising partitioning the processing capability limit of the WD 22 between different search spaces, each search space being a control resource set (CORESET).

Example 9. A wireless device 22 (WD 22) configured to communicate with a network node 16, the WD 22 configured to, and/or comprising a radio interface 82 and/or processing circuitry 84 configured to:

obtain a control channel elements (CCE) limit for the WD 22; and determine at least one Physical Downlink Control Channel (PDCCH) candidate for the WD 22 using the CCE limit.

Example 10. The WD 22 of Example 9, wherein the processing circuitry 84 is configured to determine the at least one PDCCH candidate by:

determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at at least one of the one of the plurality of aggregation levels and at least one aggregation level that is a lower aggregation level than the one of the plurality of aggregation levels.

Example 11. The WD 22 of any of Examples 9 and 10, wherein the processing circuitry 84 is configured to determine the at least one PDCCH candidate by applying a hashing function to the at least one PDCCH candidate within the CCE limit.

Example 12. The WD 22 of any of Examples 9-11, wherein the CCE limit is based on a processing capability of the WD 22.

Example 13. A method implemented in a wireless device 22 (WD 22), the method comprising:

obtaining a control channel elements (CCE) limit for the WD 22; and determining at least one Physical Downlink Control Channel (PDCCH) candidate for the WD 22 using the CCE limit.

Example 14. The method of Example 13, further comprising:

determining a set of CCEs for the at least one PDCCH candidate at a plurality of aggregation levels by incrementally accumulating the CCEs of the set of CCEs using a hashing function from a highest aggregation level towards a lowest aggregation level until the CCE limit is reached at one of the plurality of aggregation levels; and re-hashing at least one PDCCH candidate at at least one of the one of the plurality of aggregation levels and at least one aggregation level that is a lower aggregation level than the one of the plurality of aggregation levels.

Example 15. The method of any of Examples 13 and 14, further comprising determining the at least one PDCCH candidate by applying a hashing function to the at least one PDCCH candidate within the CCE limit.

Example 16. The method of any of Examples 13-15, wherein the CCE limit is based on a processing capability of the WD 22.

Example 17. A network node 16, comprising:

a memory module 73 configured to store a control channel element (CCE) limit; and a control channel module 33 configured to configure a search space to a WD based on the CCE limit of the WD 22.

Example 18. A wireless device 22, comprising:

a memory module 89 configured to store a control channel element (CCE) limit; and a determination module 35 configured to determine at least one Physical Downlink Control Channel (PDCCH) candidate for a WD 22 using the CCE limit.

Example 19. A host computer 24, comprising:

a communication module 41 configured to at least one of observe, monitor, control, transmit, and receive information associated with any of the methods of Examples 5 and/or 13.

It should be noted that some of the steps and/or functions involved in various embodiments may be executed in separate nodes and/or be subject to virtualization.

In some embodiments, configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Generally, in some embodiments, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR.

Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviations | Explanations |
| --- | --- |
| LTE | Long Term Evolution |
| MBB | enhanced Mobile BroadBand |
| MTC | Machine Type Communication |
| NR | New Radio |
| PUCCH | Physical Uplink Control Channel |
| PUSCH | Physical Uplink Shared Channel |
| SR | Scheduling Request |
| URLLC | Ultra-Reliable Low Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry configured to:
   receive a Control Channel Element, CCE, limit of the wireless device; and
   configure a search space for the wireless device to monitor based at least in part on the CCE limit of the wireless device.

2. The network node of claim 1, wherein the CCE limit of the wireless device corresponds to a processing capability limit of the wireless device and is related to a limit of a number of CCEs that the wireless device can process in a slot.

3. The network node of claim 1, wherein the search space corresponds to a subset of a control resource set, CORESET.

4. The network node of claim 1, wherein the processing circuitry is further configured to:
   determine that processing of a first CORESET and a second CORESET by the wireless device would exceed the CCE limit; and
   drop the second CORESET from wireless device monitoring based at least in part on the determination that CCE limit would be exceeded.

5. A method implemented in a network node, the method comprising:
   receiving a Control Channel Element, CCE, limit of a wireless device; and
   configuring a search space for the wireless device to monitor based at least in part on the CCE limit of the wireless device.

6. The method of claim 5, wherein the CCE limit of the wireless device corresponds to a processing capability limit of the wireless device and is related to a limit of a number of CCEs that the wireless device can process in a slot.

7. The method of claim 5, wherein the search space corresponds to a subset of a control resource set, CORESET.

8. The method of claim 5, further comprising:
   determining that processing of a first CORESET and a second CORESET by the wireless device would exceed the CCE limit; and
   dropping the second CORESET from wireless device monitoring based at least in part on the determination that CCE limit would be exceeded.

9. A wireless device configured to communicate with a network node, the wireless device comprising processing circuitry configured to monitor a search space for at least one Physical Downlink Control Channel, PDCCH, candidate, the search space being based at least in part on a control channel element, CCE, limit of the wireless device.

10. The wireless device of claim 9, wherein the CCE limit is based at least in part on a CCE processing capability of the wireless device.

11. The wireless device of claim 9, wherein the processing circuitry is further configured to communicate the CCE limit of the wireless device.

12. The wireless device of claim 9, wherein the search space corresponds to a subset of a control resource set, CORESET.

13. The wireless device of claim 9, wherein the monitoring of the search space includes blind decoding at least one CCE for downlink control information, DCI associated with the wireless device.

14. The wireless device of claim 9, wherein the search space includes both a common search space and a wireless device specific search space within a first control resource set, CORESET; and
   a second CORESET being dropped from monitoring by the wireless device based at least in part on the CCE limit.

15. A method implemented in a wireless device, the method comprising monitoring a search space for at least one Physical Downlink Control Channel, PDCCH, candidate, the search space being based at least in part on a Control Channel Element, CCE, limit of the wireless device.

16. The method of claim 15, wherein the CCE limit is based at least in part on a CCE processing capability of the wireless device.

17. The method of claim 15, further comprising communicating the CCE limit of the wireless device.

18. The method of claim 17, wherein the CCE limit is based at least in part on a CCE processing capability of the wireless device.

19. The method of claim 15, wherein the search space corresponds to a subset of a control resource set, CORESET.

20. The method of claim 15, wherein the monitoring of the search space includes blind decoding at least one CCE for downlink control information, DCI associated with the wireless device.

21. The method of claim 15, wherein the search space includes both a common search space and a wireless device specific search space within a first control resource set, CORESET; and
   a second CORESET being dropped from monitoring by the wireless device based at least in part on the CCE limit.

* * * * *